United States Patent [19]

Hallbach et al.

[11] Patent Number: 5,595,218
[45] Date of Patent: Jan. 21, 1997

[54] VALVE CONSTRUCTION

[75] Inventors: Raymond L. Hallbach, Cold Springs, Ky.; Miles E. Loretta, Jr.; Douglas W. Vallance, both of Cincinnati, Ohio

[73] Assignee: Cincinnati Milacron Inc., Cincinnati, Ohio

[21] Appl. No.: 401,576

[22] Filed: Mar. 9, 1995

[51] Int. Cl.$^6$ .................................................. F16K 11/07
[52] U.S. Cl. .................. 137/625.18; 29/890.126; 29/890.128; 91/407; 137/625.48; 137/625.69
[58] Field of Search .................. 29/890.12, 890.124, 29/890.126, 890.128; 91/407; 137/625.18, 625.48, 625.69

[56] References Cited

U.S. PATENT DOCUMENTS

| | | | |
|---|---|---|---|
| 583,822 | 6/1897 | Shem | 137/625.48 X |
| 2,702,529 | 2/1955 | Doerfner | 137/625.69 |
| 2,742,924 | 4/1956 | Harter | 137/625.48 X |
| 2,798,461 | 7/1957 | Gold et al. | 137/625.69 |
| 2,953,163 | 9/1960 | Ainsworth | 137/625.69 |
| 3,103,739 | 9/1963 | Moog . | |
| 3,163,175 | 12/1964 | Pearson | 137/625.69 X |
| 3,206,837 | 9/1965 | Holmes . | |
| 3,240,231 | 3/1966 | Cadiou | 137/625.67 |
| 3,307,586 | 3/1967 | Meyer | 137/625.69 |
| 3,353,249 | 11/1967 | MacFarlane et al. . | |
| 3,885,284 | 5/1975 | Clippard, III . | |
| 4,254,799 | 3/1981 | Blatt | 137/625.69 |
| 5,261,147 | 11/1993 | Wood, III | 29/33 |

*Primary Examiner*—Gerald A. Michalsky
*Attorney, Agent, or Firm*—Thomas M. Farrell

[57] ABSTRACT

A solid valve spool is split in two, by cutting through its center land diameter. A drill rod spacer is machined to length and inserted between the spool pieces to establish a spool assembly having a precise land width. The spool pieces and spacer are biased together in assembly so as to travel in unison, within a valve bushing, when shifted to control fluid flow, and the precisely-spaced land edges serve to pinch off fluid flow.

2 Claims, 2 Drawing Sheets

VALVE CONSTRUCTION

FIELD OF INVENTION

This invention relates to fluid control valves where it is desirable to establish a precise land width on a shiftable spool.

BACKGROUND OF THE INVENTION

Many fluid control valves utilize axially shiftable spools to direct fluid to radial ports of a valve bushing; the edges of valve spool lands coact with the ports in a manner well known in the fluid control arts. Precise correlation between port spacing and land edge spacing is usually not a problem, since many spools do not perform a metering function and are simply fired quickly by a solenoid operator to uncover a port.

In flow metering valves, e.g., servo valves and deceleration valves, where precision mechanical movements must translate to exact flow requirements, and vice-versa, problems can arise if the exact connection of a land with a port is not predictable.

Several prior art U.S. patents have dealt with attempting to construct valve bushings in a manner controlling port spacing and port cross section:

U.S. Pat. No. 3,103,739, of W. C. Moog, Sep. 17, 1963, teaches machining squared port notches across the ends of bushing sections, sizing the overall length of the discrete sections, serially stacking the bushing sections, and brazing the assembled sections together to create a unitary bushing.

U.S. Pat. No. 3,353,249, of C. E. MacFarlane et al., Nov. 21, 1967, teaches forming of bushing sections by sintering metal, forming port notches across the ends, and adhesively bonding the sections together to create a unitary bushing.

U.S. Pat. No. 3,885,284, of W. L. Clippard, III, May 27, 1975, teaches assembling separate sleeve components within a manifold cavity, for supporting an axially shiftable spool, and securely maintaining the sleeve components in an axially spaced relationship to create an annular gap between one another.

Another prior art U.S. patent has dealt with attempting to create a low cost valve spool with modular components:

U.S. Pat. No. 3,206,837, of S. H. Holmes, Sep. 21, 1965, teaches a method of manufacturing a reciprocal four-way spool valve, wherein discrete annular segments are assembled onto a mandrel, or core. The core has a head at one end and threads at the other, so that assembled segments can be rigidly maintained in position on the core, and thereby create a unitary valve spool. The valve housing is made of discrete plates, interlaminated between the spool segments and rigidly held together. The spool meters oil across the disc faces.

The forgoing patents teach relatively complex valve construction techniques which are obviated by the present invention.

SUMMARY OF THE INVENTION

The invention is shown and described in connection with a method for establishing a precise land width on the spool of a fluid control valve, and in connection with a particular valve apparatus.

The method comprises the following steps:

providing a valve bushing with first and second orifices spaced to a known dimension along a valve bushing bore;

providing a one-piece valve spool for the bore, the spool having a land with first and second land edges for coacting with the first and second orifices to control fluid flow;

splitting the one-piece spool into two pieces by cutting through the land;

providing a spacer which slidably fits within the bore;

machining the length of the spacer to establish a predetermined width of the land when the spool is in two pieces;

assembling the spacer between the two spool pieces, within the valve bushing bore; and biasing the spacer and the two spool pieces together so as to travel in unison within the valve bushing bore.

The valve apparatus comprises:

a valve bushing, having a bore and orifices spaced along the bore;

first and second valve spool pieces slidably received within the bore, the spool pieces having respective first and second land portions;

a spacer, located within the bore, between the land portions, the spacer establishing a predetermined assembled land width across the first and second land portions;

means for biasing the first and second valve spool pieces and the spacer together so as to travel in unison within the bore; and means for slidably shifting the valve spool pieces and spacer within the bore to control fluid flow through the orifices.

DESCRIPTION OF THE INVENTION

Figure 1:
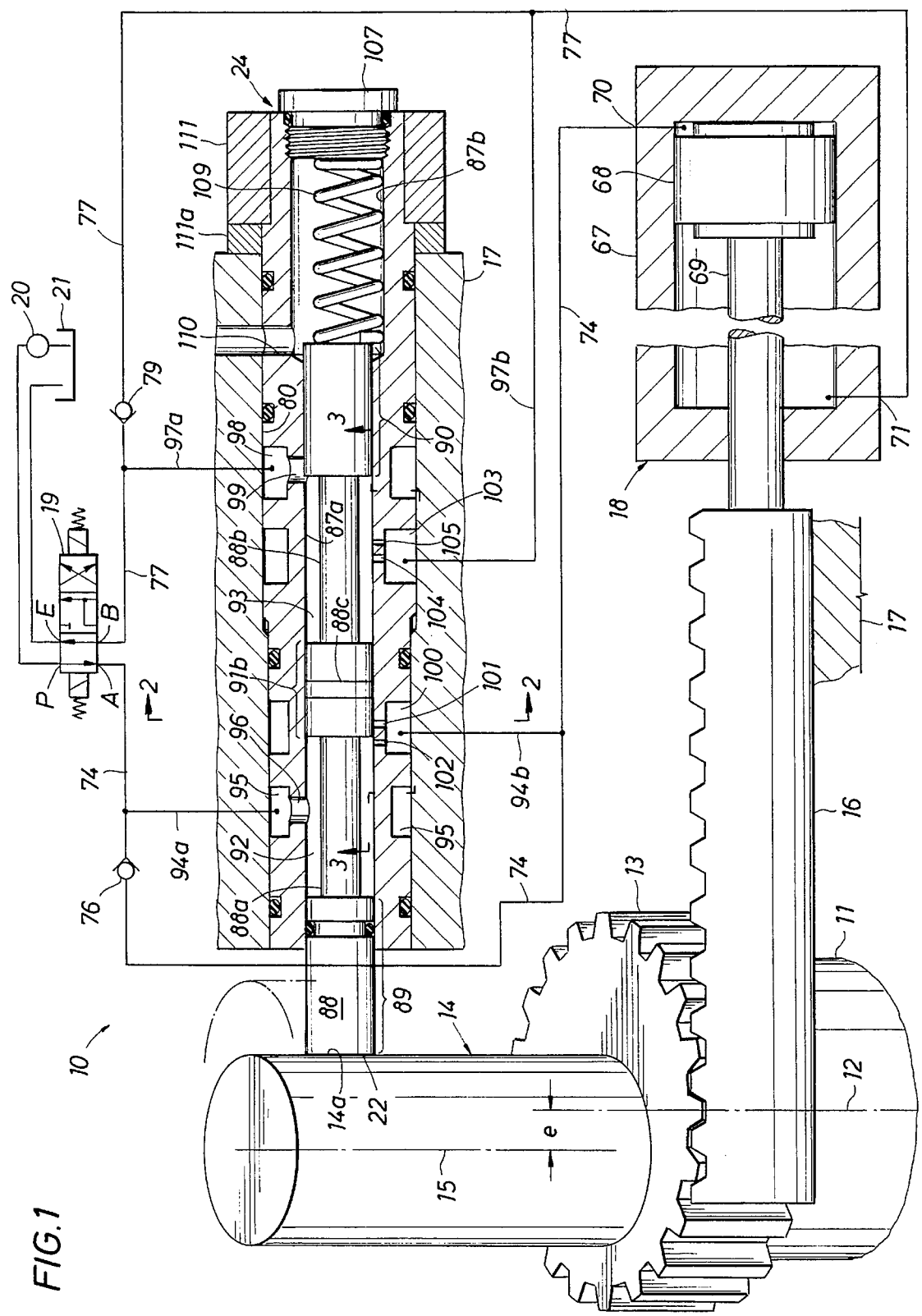
FIG. 1 is a schematic view of the elements of an indexing system.

Referring to the drawings, FIG. 1 is a schematic view showing the interworking components of an indexing system 10. The system 10 is used in a rotary pallet exchange mechanism for machining centers, such as that depicted in U.S. Pat. No. 5,261,147, the entire disclosure of which is expressly incorporated herein by reference.

A rotary shaft 11 is supported for reversable 180° rotation about a vertical axis 12, and the bottom of the shaft 11 is connected to a pallet exchanger (not shown), which comprises a shaft load; further reference to the "shaft" should, therefore, be construed as meaning the "shaft and its supported load". The shaft 11 has a large integral gear 13 for driving around the vertical axis 12, and the top portion of the shaft 11 is configured as a cylindrical cam 14 having its longitudinal axis 15 parallel to, and offset from, the vertical axis 12 by an amount e.

The shaft 11 is rotated by a linear rack 16 engaging the gear 13. The rack 16 is slidably mounted in a support housing 17, and is longitudinally shifted by a hydraulic actuator 18. The hydraulic actuator 18 comprises a cylinder 67, containing a piston 68 with a piston rod 69 affixed to the rack 16, such that shifting of the piston 68 within the cylinder 67 will cause corresponding shifting of the rack 16 and rotation of the rotary shaft 11. The cylinder 67 has first and second ports 70,71, at opposite ends.

A directional valve 19 is provided, which is a double-solenoid-actuated, spring-centered, four-way valve, having a pressure port P connected to a pump 20, an exhaust port E connected to a hydraulic fluid reservoir 21, and cylinder ports A and B connected, respectively, to the first and second ports 70,71 of the cylinder 67 via lines 74 and 77. Lines 74 and 77 contain check valves 76,79, the check valves 76,79 being arranged to provide free flow from the directional valve 19 to the cylinder 67, and blocked flow from the cylinder 67. The directional valve 19 can be controlled by a machine operator or by computer, as is well-known in the art.

A control valve 24 is mounted in a stepped housing bore 80, and has a valve bushing 81 which is slidably received within the housing bore 80. The valve bushing 81 has an accurate center bore 87a, and a clearance counterbore 87b. A valve spool assembly 88 is located within the center bore 87a and is axially shiftable therein. As used herein, the term "valve bushing" means any valve member capable of supporting a valve spool assembly and porting fluid. Adjacent its ends, the spool assembly 88 is provided with end lands 89 and 90. The spool assembly 88 is further provided with a center land 91b. The lands 89,90,91b divide the center bore 87a into two chambers 92,93. The spool assembly 88 is comprised of first and second spool pieces 88a,b abutting a disk-like spacer 88c. Further details of spool construction are discussed in connection with FIG. 4.

Ahead of its check valve 76 (i.e., between its checkvalve 76 and the directional valve), line 74 is connected by branch line 94a to an annular passage 95 formed by the valve bushing 81 and the housing bore 80; the passage 95, in turn, is connected by a cross hole 96 to the first chamber 92. In similar fashion, line 77, ahead of its check valve 79, is connected by branch line 97a to an annular passage 98 formed by the valve bushing 81 and the housing bore 80; the annular passage 98 is connected to the second chamber 93 by a cross hole 99.

Figure 2:
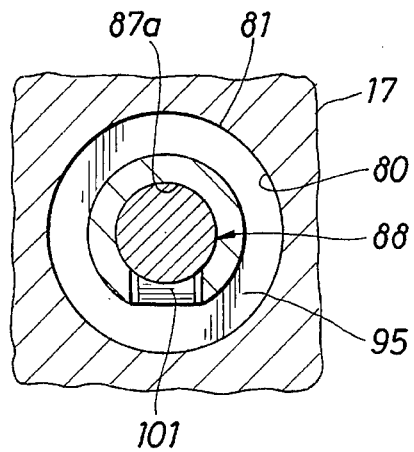
FIG. 2 is an elevational cross section, taken along the line 2—2 of FIG. 1.
Figure 3:
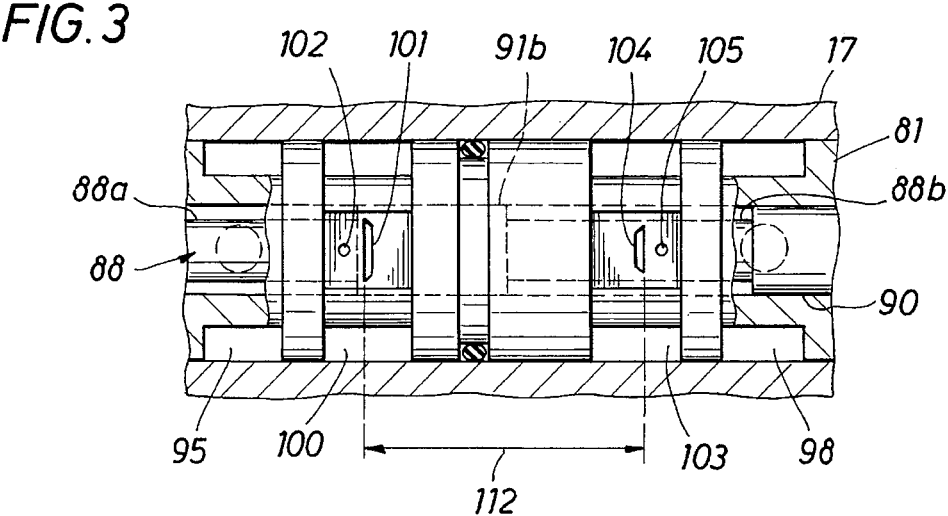
FIG. 3 is a plan section, taken along the line 3—3 of FIG. 1.

After its check valve 76, line 74 is connected by branch line 94b to an annular passage 100 defined by the valve bushing 81 and the bore 80. The passage 100 communicates with the first chamber 92 via a first variable flow metering port 101 and a first fixed flow metering port 102 (see also FIGS. 2 and 3). Similarly, after its check valve 79, line 77 is connected by branch line 97b to an annular passage 103 formed by the valve bushing 81 and the housing bore 80. The annular passage 103 communicates with the second chamber 93 via a second variable flow metering port 104 and second fixed flow metering port 105 (FIG. 3). In the embodiment chosen, the first and second variable flow metering ports 101,104 have a trapezoidal shape, and the first and second fixed flow metering ports 102,105 have a circular shape.

The cam 14 and its cam surface 14a determine the axial position of the spool assembly 88. This arrangement constitutes a feedback system since the axial position of the spool assembly 88 depends upon the rotative position of the cam 14, i.e., the rotative position of the rotary shaft 11. A cap 107 at the end of the valve bushing 81 forms a seat for a compression spring 109. The compression spring 109, together with pressurized hydraulic fluid received from a side port 110, constantly biases the spool assembly 88 toward the cam 14, and the spool assembly end surface 22 into abutment with the cam surface 14a.

An external retainer plate 111 is received on the valve bushing 81 and secured to the housing 17 by screws (not shown), to provide a shoulder for the valve bushing 81 to react against. A fitting washer 111a is also received on the valve bushing 81, adjacent the plate 111, so that the axial position of the valve bushing 81 within the housing bore 80 can be adjusted relative to the cam 14.

The elements of the indexing system 10 having been described in detail, its mode of operation will now be set forth, with reference to FIG. 1. It may be noted that the normal, deenergized position of the directional valve 19 is the center position, where both cylinder ports A,B are exhausted to the reservoir 21, and the pressure port P is blocked. Rotation of the rotary shaft 11 is initiated by shifting the directional valve 19 to the position shown. In this position, pressurized hydraulic fluid passes through the checkvalve 76 and into the first port 70 of the cylinder 67, via line 74. A portion of the hydraulic fluid will also enter and fill the first chamber 92 via branch lines 94a,b.

This flow will cause the piston 68, piston rod 69 and rack 16 to shift from their positions shown in FIG. 1 toward the left, imparting rotation to the rotary shaft 11 in a clockwise direction, as would be viewed from above in FIG. 1. As the piston 68 of the hydraulic actuator 18 shifts to the left, hydraulic fluid exhausting from the cylinder 67 to the left of the piston 68 will exit via port 71, to line 77.

Line 77 is connected to the reservoir 21 when the directional valve 19 is shifted as in FIG. 1. Hydraulic fluid, however, cannot go directly from the cylinder port 71 to the reservoir 21 solely via line 77, by virtue of the check valve 79. As a consequence, the fluid from the second port 71 of the cylinder 67 must flow via branch line 97b into the annular passage 103. From the annular passage 103 the hydraulic fluid will pass through the second variable flow metering port 104 and the second fixed flow metering port 105 into the chamber 93; the last two mentioned flow metering ports 104,105 will determine the rate of flow of the hydraulic fluid from the annular passage 103 into the chamber 93. From the chamber 93, hydraulic fluid will flow through the cross hole 99 and the annular passage 98 to line 97a which connects with line 77 ahead of the checkvalve 79. Flow is then free to pass through the directional valve 23 to the reservoir 21.

As soon as rotation of the rotary shaft 11 begins, rotation of the cam 14 also begins, resulting in simultaneous longitudinal axial movement of the control valve spool assembly 88. The spool assembly 88 starts out from a position where its center land 91b is covering the first variable flow metering port 101, as shown in FIG. 1. During the time it takes for the cam 14 to shift the spool assembly 88 to the right of FIG. 1, to a position where its center land 91b begins to close the second variable flow metering port 104, rotation of the rotary shaft 11 will have accelerated and reached a maximum rotational speed; the rotary shaft 11 will then run in an open loop, generally constant velocity fashion for a large portion of its stroke.

When the rotary positions of the rotary shaft 11 and cam 14 are such that the cam 14 has shifted the spool assembly 88 to an axial position where the center land 91b will begin to close the second variable flow metering port 104, deceleration of rotation of the rotary shaft 11 and cam 14 will begin and will continue until the center land 91b completely closes the second variable flow metering port 104. At this point, hydraulic fluid flow through the second fixed flow metering port 105 will bring the rotary shaft 11 to its desired final position, at a creep rate, and will maintain it there, while the directional valve 19 is energized.

From the above explanation, it will be apparent that the control valve 24 operates as a function of the position of the rotary shaft 11 using feedback via the cam 14.

The first and second variable flow metering ports 101 and 104 are so oriented that the center land 91b, during a particular deceleration stroke, closes the appropriate one of the first and second variable flow metering ports 101,104 by passing thereacross from the trapezoidal port apex to the base.

The dimension 112 between the extreme edges of the spaced first and second variable flow metering orifices 101,104 (FIG. 3) is measured before the valve bushing 81 is secured into the support housing 17. Position of the first variable flow metering orifice 101 relative to the first edge 113 of the center land 91b of the spool assembly 88 is readily settable, via the fitting washer 111a, with the spool assembly 88 biased against the cam 14 in FIG. 1, i.e., to shut off the orifice 101.

Figure 4:
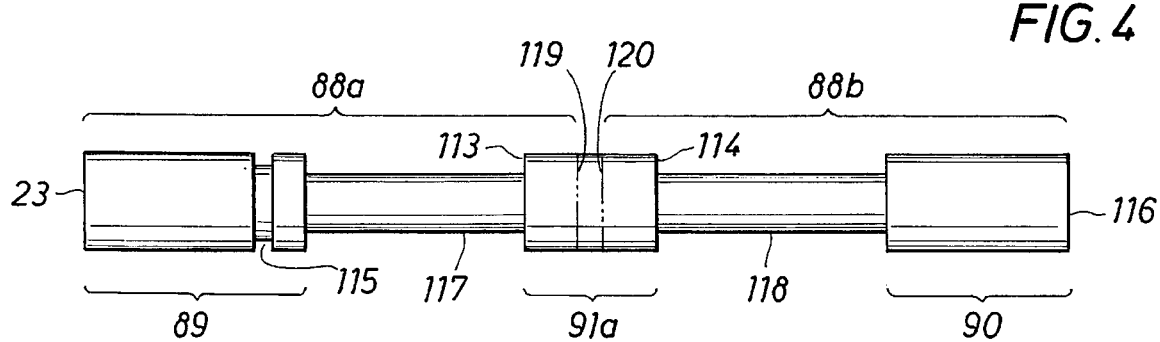
FIG. 4 is a side view of a valve spool.

With reference to FIG. 4, a cylindrical solid spool 23 is manufactured to the general specification of the spool assembly 88, with end lands 89,90 and a center land 91a sized to fit the center bore 87a of the valve bushing 81. The solid spool 23 has sharp corners at its center land edges 113,114, and is hardened, ground, lapped, etc., and easily handled as one piece. The spool 23 also has an o-ring groove 115 in the left end land 89, a right end face 116, and stem portions 117,118 connecting the lands, in a conventional manner. While not depicted, balance grooves may be provided along the lands, in a manner well known in the art. The solid spool 22 is then split into first and second spool pieces 88a,b, by cutting diametrically through its center land 91a. The cut faces 119,120 are ground square with the land diameter. Using the dimension 112 between the extreme edges of the first and second variable flow metering orifices 101,104, a spacer 88c (see FIG. 1), capable of sliding within the center bore 87a of the valve bushing 81, is machined to establish the proper land width between the first and second land edges when the spool pieces 88a,b and spacer 88c are stacked in assembly within the valve bushing 81, and biased together by the compression spring 109 and pressurized fluid from the side port 110. The spacer 88c is preferably made from commercially available drill rod, which is purchased hardened and has a diametrical tolerance which runs several ten-thousandths under its nominal size. A minimum width of the assembled center land 91b is at least the variable flow metering orifice spacing (dimension 112) minus the full cam stroke ($2e$), to ensure that both variable flow metering orifices 101,104 will be shut off with the full stroke of the cam 14. The center land width may be expressed by the equation $W \geq X - 2e$, where:

W=width of the assembled land 91b;

X=dimension 112 between extreme edges of the variable flow metering orifices 101,104; and e=cam eccentricity.

While the invention has been shown in connection with a deceleration valve 24, it will be appreciated by those skilled in the art that a biased, stacked spool assembly may be applied to other fluid control valves, and the invention extends to all designs and modifications as come within the scope of the appended claims.

What is claimed is:

1. A method for establishing a precise land width on the spool of a fluid control valve, comprising the following steps:

providing a valve bushing with first and second orifices spaced to a known dimension along a valve bushing bore;

providing a one-piece valve spool for said bore, said spool having a land with first and second land edges for coacting with said first and second orifices to control fluid flow;

splitting said one-piece spool into two spool pieces by cutting through said land;

providing a spacer which slidably fits within said bore;

machining the length of said spacer to establish a predetermined width of said land when said spool is in two pieces;

assembling said spacer between said two spool pieces, within said valve bushing bore; and biasing said spacer and said two spool pieces together so as to travel in unison within said valve bushing bore, and such that said spacer is caused to travel only in response to movement of said spool pieces.

2. A valve apparatus, comprising:

a valve bushing, having a bore and orifices spaced along said bore;

first and second valve spool pieces slidably received within said bore, said spool pieces having respective first and second land portions, and said spool pieces being formed by splitting a one piece valve spool in two;

a spacer, slidably received within said bore, between said land portions, said spacer establishing a predetermined assembled land width across said first and second land portions;

means for biasing said first and second valve spool pieces and said spacer together so as to travel in unison within said bore, and such that said spacer is caused to travel only in response to movement of said spool pieces; and means for slidably shifting said valve spool pieces and spacer within said bore to control fluid flow through said orifices.

* * * * *